(12) United States Patent
Kitagata et al.

(10) Patent No.: US 8,667,335 B2
(45) Date of Patent: Mar. 4, 2014

(54) INFORMATION PROCESSING APPARATUS AND METHOD FOR ACQUIRING INFORMATION FOR HUNG-UP CAUSE INVESTIGATION

(75) Inventors: Kazuya Kitagata, Kawasaki (JP); Hiroshi Kondou, Kawasaki (JP); Hiroyuki Izui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 210 days.

(21) Appl. No.: 12/929,706

(22) Filed: Feb. 9, 2011

(65) Prior Publication Data

US 2011/0138232 A1 Jun. 9, 2011

Related U.S. Application Data

(63) Continuation of application No. PCT/JP2008/064450, filed on Aug. 12, 2008.

(51) Int. Cl.
*G06F 11/00* (2006.01)

(52) U.S. Cl.
USPC ........................... 714/38.11; 714/37

(58) Field of Classification Search
USPC .............. 714/37, 38.11, 38.12, 38.13, 38.14, 714/38.1
See application file for complete search history.

(56) References Cited

U.S. PATENT DOCUMENTS

| | | | | |
|---|---|---|---|---|
| 6,601,188 B1 * | 7/2003 | Wilding | ............................ | 714/15 |
| 7,069,470 B2 * | 6/2006 | Wilding et al. | .................. | 714/34 |
| 2002/0166083 A1 * | 11/2002 | Anderson et al. | ................ | 714/37 |
| 2003/0120968 A1 * | 6/2003 | Andress et al. | .................. | 714/25 |
| 2005/0120273 A1 * | 6/2005 | Hudson et al. | .................. | 714/38 |
| 2006/0136877 A1 | 6/2006 | Gdaniec et al. | | |

FOREIGN PATENT DOCUMENTS

| | | |
|---|---|---|
| JP | 60-238946 | 11/1985 |
| JP | 63-226746 | 9/1988 |
| JP | 5-53882 | 3/1993 |
| JP | 9-305443 | 11/1997 |
| JP | 2000-267899 | 9/2000 |
| JP | 2002-182951 | 6/2002 |
| JP | 2007-207014 | 8/2007 |

OTHER PUBLICATIONS

Japanese Office Action issued Oct. 9, 2012 in corresponding Japanese Patent Application No. 2010-524634.
International Search Report for PCT/JP2008/064450, mailed Sep. 9, 2008.
English Translation of the International Preliminary Report on Patentability mailed Feb. 24, 2011 in corresponding International Patent Application PCT/JP2008/064450.
Extended European Search Report dated Jun. 5, 2012 issued in corresponding European Patent Application No. EP08792383.

* cited by examiner

*Primary Examiner* — Joshua Lohn
(74) *Attorney, Agent, or Firm* — Staas & Halsey LLP

(57) ABSTRACT

According to an aspect of the embodiment, a switch for information acquisition, which is included in an information processing apparatus, inputs an acquisition instruction of information for a hung-up cause investigation. A trace information acquiring unit, which is included in the information processing apparatus, acquires trace information of a first target process, which is set in a trace information setting file. A core file generating unit, which is included in the information processing apparatus, generates a core file of a second target process, which is set in a core setting file.

9 Claims, 5 Drawing Sheets

INFORMATION PROCESSING APPARATUS AND METHOD FOR ACQUIRING INFORMATION FOR HUNG-UP CAUSE INVESTIGATION

CROSS-REFERENCE TO RELATED APPLICATIONS

This is a continuation application of PCT application Ser. No. PCT/JP2008/064450, filed on Aug. 12, 2008.

FIELD

The embodiments discussed herein are related to an information processing apparatus and a method for acquiring information for a hung-up cause investigation.

BACKGROUND

There is an OS (Operating System) which has a core dump function for outputting content (a "memory image") of a main memory at the time to an external storage device such as a hard disk, by trace information of a process designated by a command or when a program abnormally ends because of an error. For example, in UNIX (registered trademark) and LINUX (registered trademark), it is possible to obtain trace information of a designated process by using a truss command. For example, when a "gcore command" is used, it is possible to generate a memory image of the designated process as a core file.

A file including the memory image obtained in the core dump function as its content is called a "core file".

A snapshot dump processing system is proposed to execute a snapshot dump according to a state of a switch for debug.

Patent Document 1: Japanese Laid-Open Patent Publication No. 60-238946

FIG. 5 is a diagram for explaining a specific example of a related art. As illustrated in #1 of FIG. 5, when a switch provided in an information processing apparatus (e.g., a UNIX server) is depressed, the information processing apparatus notifies an OS of the information processing apparatus of an interrupt of a panic instruction (refer to #2 of FIG. 5). The interrupt of the panic instruction is an interrupt for instructing the OS to execute panic processing. When the OS receives the interrupt of the panic instruction, the OS calls panic processing explained later (refer to #3 of FIG. 5). The OS causes a CPU (Central Processing Unit) to execute the panic processing (refer to #4 of FIG. 5). The panic processing is, for example, a display/recording processing for a panic message (a message indicating that the information processing apparatus is to be restarted), a synchronization processing for a file system, and a kernel dump processing. The kernel dump processing is a processing for acquiring a memory area used by a kernel. When a command for notifying the interrupt of the panic instruction is executed through a firmware, which is included in the information processing apparatus (refer to #5 of FIG. 5), similarly, the panic processing is executed as illustrated in #4 of FIG. 5, after the notification of the interrupt of the panic instruction to the OS and the invocation of the panic processing are executed as illustrated in #2 and #3 of FIG. 5.

When a trouble of hung-up of a system occurs, in other words, the system does not receive an input from an input device or does not send an output to an output device, for example, the kernel dump is performed by the depression of the switch or by the execution of the command, as explained with reference to FIG. 5, to investigate a cause of the occurrence of the hung-up. Further, total dump for obtaining an entire content of mounted memories is performed according to a procedure same as the kernel dump. However, when the entire system is hung up or no longer operable because a process operating in a user space is hung up or looped, trace information and a core file of the process which is a cause of the hung-up cannot be obtained. Therefore, it is difficult to identify the cause of the hung-up.

In the total dump, since the capacity of a dump file is large, it takes labor and time to identify and extract information of the process which is the cause of the hung-up. A portion swapped out from the mounted memory at a time hung-up is not obtained. In the kernel dump, information of the user space of the process which is the cause of the hung-up is not obtained.

In particular, there is a case that a trouble of stop of a boot processing for performing startup of the system of the information processing apparatus, and a case that a trouble of stop of a shutdown processing for performing shutdown of the system of the information processing apparatus occurs, because a processing of a specific process stops during the boot or during the shutdown of the system. In this case, it is impossible to log in the system, and to use a terminal for performing a command operation. Therefore, it is impossible to perform the command operation to sample the trace information and the core file of the process, so that an investigation often makes slow progress. In a related art in which a user depresses the switch provided in the information processing apparatus to perform the total dump or the kernel dump, even when a process causing a trouble can be identified, it is difficult to further identify a cause of stop of the process.

Therefore, when a hung-up occurs in the information processing apparatus, it is difficult to acquire information for a hung-up cause investigation, which is information used for investigating a cause of the hung-up.

SUMMARY

According to an aspect of the embodiment, an information processing apparatus acquires trace information of a process and memory image information of the process as information for a hung-up cause investigation when a hung-up occurs in the information processing apparatus. The information processing apparatus includes: an instruction input unit that inputs an acquisition instruction of information for a hung-up cause investigation; a trace information acquiring unit that acquires trace information of a target process set in a first setting file as a target to be acquired the trace information when the acquisition instruction of the information for the hung-up cause investigation is inputted; and a memory image information generating unit that generates memory image information of a target process set in a second setting file as a target to be acquired the trace information when the acquisition instruction of the information for the hung-up cause investigation is inputted.

When an acquisition instruction of the information for the hung-up cause investigation is inputted, the information processing apparatus acquires the trace information of a target process set in advance, and generates the memory image information. Therefore, for example, even when the hung-up occurs in the information processing apparatus, and it is impossible to log in the information processing apparatus, it is possible to acquire trace information and a core file of the target process set in advance. In particular, even when a trouble of stop of boot processing and shutdown processing occurs because processing of a specific process stops during boot or during shutdown of the information processing apparatus, it is possible to acquire the trace information and the core file of the target process. As a result, it is possible to easily investigate a cause of the hung-up that occurs in the information processing apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

An information processing apparatus is provided which acquires trace information of a process and memory image information of the process as information for a hung-up cause investigation when a hung-up occurs in the information processing apparatus.

In addition, a method for acquiring information for a hung-up cause investigation is provided in which trace information of a process and memory image information of the process are acquired as information for a hung-up cause investigation when a hung-up occurs in the information processing apparatus.

According to another aspect of the embodiment, a method for acquiring information a the hung-up cause investigation is to acquire trace information of a process and memory image information of the process as the information for the hung-up cause investigation when a hung-up occurs in the information processing apparatus. The method includes: inputting, in an information processing apparatus, an acquisition instruction of information for a hung-up cause investigation; acquiring, in the information processing apparatus, when the acquisition instruction of the information for the hung-up cause investigation is inputted, trace information of a target process which is set in a first setting file as a target to be acquired the trace information; and generating, in the information processing apparatus, when the acquisition instruction of the information for the hung-up cause investigation is inputted, memory image information of a target process which is set in a second setting file as a target to be acquired the trace information.

Preferred embodiments of the present invention will be explained with reference to accompanying drawings.

Figure 1:
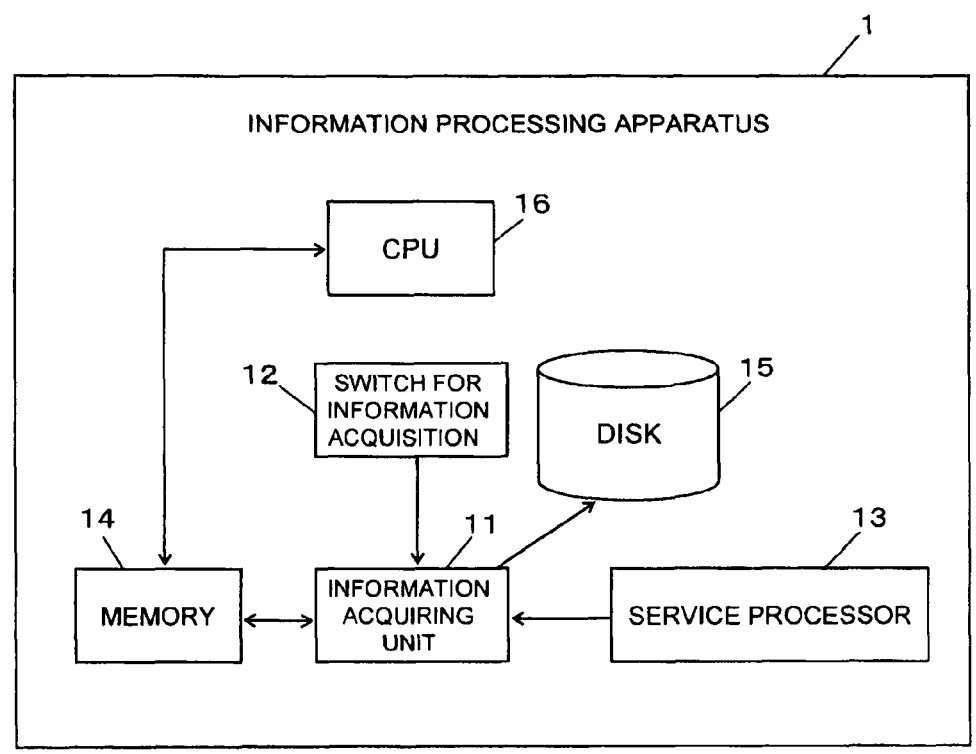
FIG. 1 is a diagram illustrating a structure example of an information processing apparatus.

An information processing apparatus is explained below with reference to the drawings. FIG. 1 is a diagram illustrating a structure example of the information processing apparatus. An information processing apparatus 1 is a computer apparatus such as a UNIX server that acquires trace information of a process and memory image information of the process as information for a hung-up cause investigation when a hung-up occurs. The information for the hung-up cause investiga-tion is information used for investigating a cause of the hung-up. In FIG. 1, a case in which the information processing apparatus 1 is a server apparatus of a UNIX system is explained as an example. A service processor 13 explained later is operable even when the information processing apparatus 1 is hung up.

The information processing apparatus 1 includes an information acquiring unit 11, a switch for information acquisition 12, a service processor 13, a memory 14, a disk 15, and a CPU (Central Processing Unit) 16. The information acquiring unit 11 has functions of an OS (Operating System) such as a file managing function, a memory managing function, and a process managing function. When an acquisition instruction of information for a hung-up cause investigation is inputted, the information acquiring unit 11 acquires trace information of a process as an acquisition target of trace information (hereinafter, first target process), which is set in a trace information setting file 231 (refer to FIG. 2) in advance. In addition, the information acquiring unit 11 generates a core file of a process as a generation target of a core file (hereinafter, second target process), which is set in a core setting file 241 (refer to FIG. 2) in advance. The acquisition instruction of the information for the hung-up cause investigation is issued, for example, by depression of the switch for information acquisition 12 explained later. The core file is memory image information of the generation target process.

Specifically, the information acquiring unit 11 acquires trace information of the first target process, and generates memory image information of the second target process, referring to memory information in the memory 14. And, the information acquiring unit 11 stores both the acquired trace information and the generated memory image information in the disk 15.

When a command which inputs the acquisition instruction of the information for the hung-up cause investigation is executed by the service processor 13 explained later, the information acquiring unit 11 acquires trace information of the target process, which is set in the trace information setting file 231. In addition, the information acquiring unit 11 generates a core file of the target process, which is set in the core setting file 241.

When the switch for information acquisition 12 is depressed by a user of the information processing apparatus 1 when the hung-up occurs, the switch for information acquisition 12 inputs the acquisition instruction of the information for the hung-up cause investigation. The input of the acquisition instruction of the information for the hung-up cause investigation is a notification of an interrupt of a panic instruction to the information acquiring unit 11. The interrupt of the panic instruction is an interrupt for instructing the information acquiring unit 11 to execute a panic processing, an acquisition processing for trace information, and a generation processing for a core file, which are explained later. Specifically, predetermined interrupt notifying unit, which is included in the information processing apparatus 1, detects that the switch for information acquisition 12 is depressed, and notifies the information acquiring unit 11 of the interrupt of the panic instruction.

The service processor 13 includes a CPU provided separately from a CPU of a server main body and firmware executed by the CPU. When the hung-up occurs, according to a designation input of the user, the service processor 13 executes, using the firmware, a command which inputs the acquisition instruction of the information for the hung-up cause investigation. Specifically, when the service processor 13 executes the command which inputs the acquisition instruction of the information for the hung-up cause investigation, the interrupt notifying unit notifies the information acquiring unit 11 of the interrupt of the panic instruction. The memory information is stored in the memory 14. The memory information includes information of an execution process of a process executed by the information processing apparatus 1. The trace information acquired by the information acquiring unit 11, and the memory image information generated by the information acquiring unit 11 are stored in the disk 15. The CPU 16 controls the processing units, which is included in the information processing apparatus 1.

Figure 2:
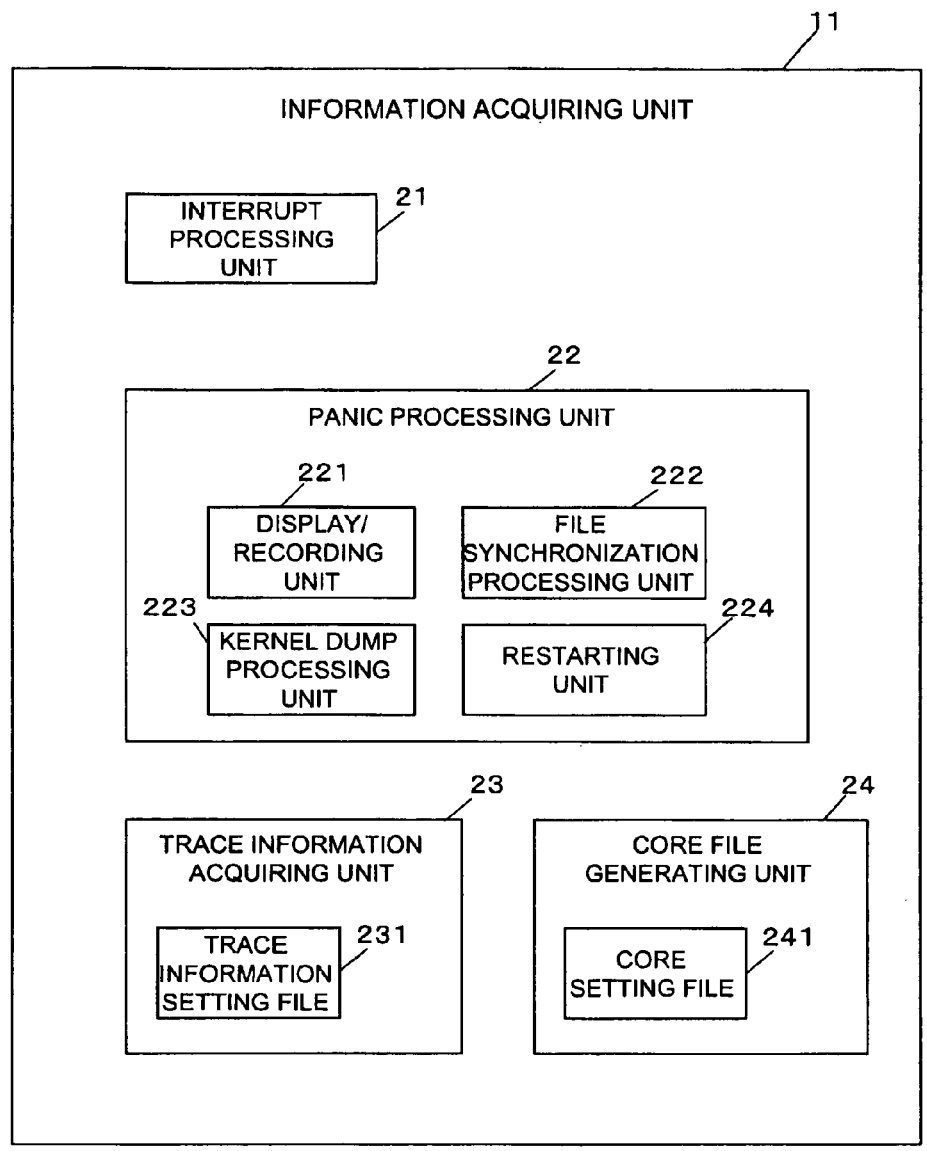
FIG. 2 is an example of a functional block diagram of an information acquiring unit.

FIG. 2 is an example of a functional block diagram of the information acquiring unit in FIG. 1. The information acquiring unit 11 includes an interrupt processing unit 21, a panic processing unit 22, a trace information acquiring unit 23, and a core file generating unit 24.

The interrupt processing unit 21 receives an interrupt of panic processing notified by depression of the switch for information acquisition 12, and sequentially calls the trace information acquiring unit 23, the core file generating unit 24, and the panic processing unit 22 explained later.

The panic processing unit 22 includes a display/recording unit 221, a file synchronization processing unit 222, a kernel dump processing unit 223, and a restarting unit 224. When the panic processing unit 22 is called by the interrupt processing unit 21, the panic processing unit 22 executes display/recording processing for a panic message, synchronization processing for a file system, kernel dump processing, and restart processing for the information processing apparatus 1. The panic message is a message indicating that the information processing apparatus 1 is restarted. The kernel dump processing is processing for acquiring a memory area used by a kernel. The display/recording unit 221 executes the display/recording processing for a panic message, the file synchronization processing unit 222 executes the synchronization processing for a file system, the kernel dump processing unit 223 executes the kernel dump processing, and the restart unit 224 executes restart processing (so-called reboot processing) for the information processing apparatus.

When the trace information acquiring unit 23 is called by the interrupt processing unit 21, the trace information acquiring unit 23 checks an acquisition period for trace information and the first target process, which is set in the trace information setting file 231 in advance. The trace information acquiring unit 23 acquires, of the first target process, trace information for the acquisition period, and records the acquired trace information in the disk 15. When the core file generating unit 24 is called by the interrupt processing unit 21, the core file generating unit 24 generates a core file of the second target process, which is set in the core setting file 241 in advance, and stores the generated core file in the disk 15.

The acquisition period for trace information and the first target process are set in the trace information setting file 231 in advance. The second target process is set in the core setting file 241 in advance. The first target process or the second target process is, for example, any one of all processes which are alive, a process which is in an execution state or executable, a process which is indicated by identification information of a process (an ID of a process, a process name, etc.) designated in advance, and a process which executes a boot processing/shutdown processing.

A setting example in the trace information setting file 231 is explained below.

When trace information of the first target process is obtained for thirty seconds, the acquisition period for trace information is set as follows in the trace information setting file 231 in advance.
truss-get-seconds=30;

When the first target process is all processes which are alive, the following setting is performed in the trace information setting file 231 in advance.
get-truss-process="all";
The trace information acquiring unit 23 checks the setting content, executes a truss command, and acquires trace information of the all processes which are alive When the first target process is only a process which is in the execution state or executable, the following setting is performed in the trace information setting file 231 in advance.
get-truss-process="run";
The trace information acquiring unit 23 checks the setting content, executes the truss command, and acquires trace information of the process which is in the execution state or executable.

When the first target process is processes which have process IDs 1 and 7, the following setting is performed in the trace information setting file 231 in advance.
get-truss-process="1,7";
The trace information acquiring unit 23 checks the setting content, executes the truss command, and acquires trace information of the processes which have the process IDs 1 and 7.

When the first target process is a process having a process name "init", the following setting is performed in the trace information setting file 231 in advance.
get-truss-process="init";
The trace information acquiring unit 23 checks the setting content, executes the truss command, and acquires trace information of the process having the process name "init".

When the first target process is a process which executes the boot processing/the shutdown processing, the following setting is performed in the trace information setting file 231 in advance.
get-truss-process="shutdown";
The trace information acquiring unit 23 checks the setting content, executes the truss command, and acquires trace information of the process which executes the boot processing/the shutdown processing.

When trace information of a process is not acquired, the following setting is performed in the trace information setting file 231 in advance.
get-truss-process="none";
A setting example in the core setting file 241 is explained below.

When the second target process is all processes which are alive, the following setting is performed in the core setting file 241 in advance.
get-core-process="all";
The core file generating unit 24 checks the setting content, executes a gcore command, and generates a core file of the all processes which are alive.

When the second target process is only a process which is in the execution state or executable, the following setting is performed in the core setting file 241 in advance.
get-core-process="run";
The core file generating unit 24 checks the setting content, executes the gcore command, and generates a core file of the process which is in the execution state or executable.

When the second target process is processes which have process IDs 1 and 7, the following setting is performed in the core setting file 241 in advance.
get-core-process="1,7";
The core file generating unit 24 checks the setting content, executes the gcore command, and generates a core file of the processes which have the process IDs 1 and 7.

When the second target process is a process which has a process name "init" (a process for starting other all processes), the following setting is performed in the core setting file 241 in advance.

get-core-process="init";

The core file generating unit 24 checks the setting content, executes the gcore command, and generates a core file of the process which has the process name "init".

When the second target process is a process which executes the boot processing/the shutdown processing, the following setting is performed in the core setting file 241 in advance.

get-core-process="shutdown";

The core file generating unit 24 checks the setting content, executes the gcore command, and generates a core file of the process which executes the boot processing/the shutdown processing.

Figure 3:
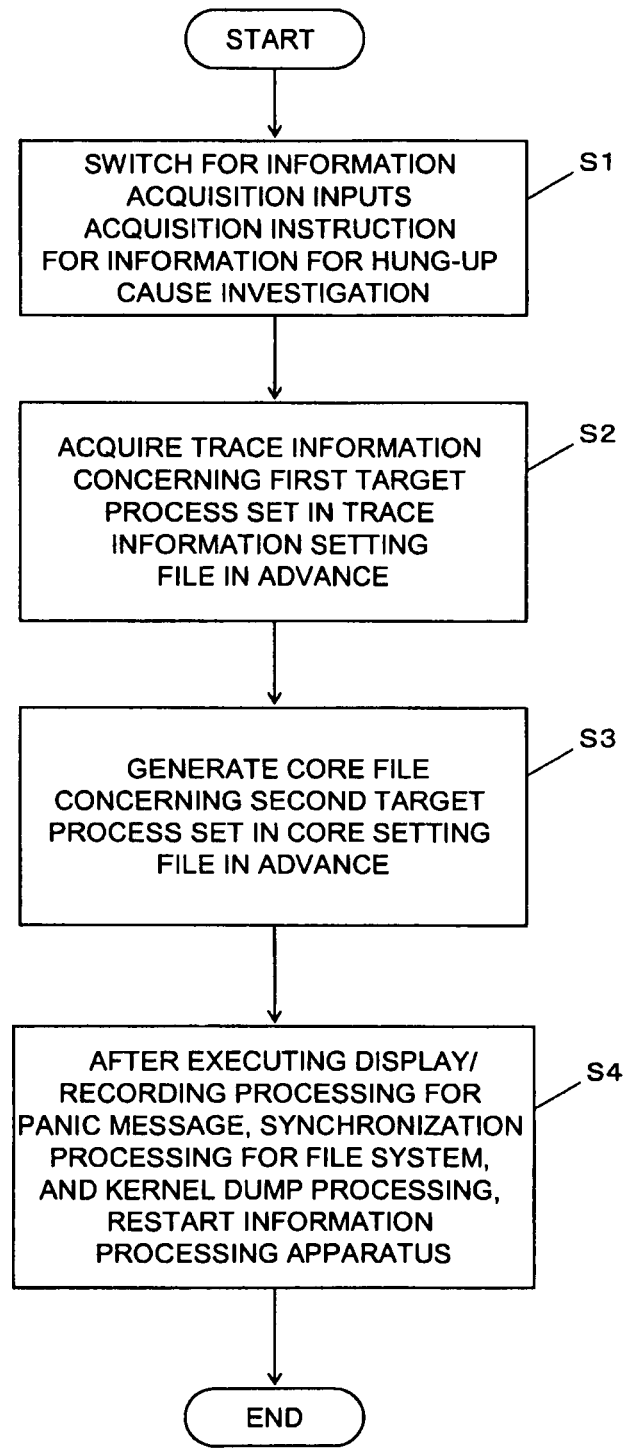
FIG. 3 is a diagram illustrating an example of an information acquisition processing flow for a hung-up cause investigation.

When a core file of a process is not generated, the following setting is performed in the core setting file 241 in advance.

get-core-process="none";

FIG. 3 is a diagram illustrating an example of an information acquisition processing flow for the hung-up cause investigation according to this embodiment. First, when the switch for information acquisition 12, which is included in the information processing apparatus 1, is depressed, the switch for information acquisition 12 inputs an acquisition instruction of the information for the hung-up cause investigation (step S1). Specifically, the predetermined interrupt notifying unit, which is included in the information processing apparatus 1, detects that the switch for information acquisition 12 is depressed, and notifies the interrupt processing unit 21, which is included in the information acquiring unit 11, of an interrupt of panic processing.

Subsequently, the trace information acquiring unit 23, which is included in the information acquiring unit 11, is called from the interrupt processing unit 21, and acquires trace information of the first target process, which is set in the trace information setting file 231 in advance (step S2).

The core file generating unit 24, which is included in the information acquiring unit 11, is called from the interrupt processing unit 21, and generates a core file of the second target process, which is set in the core setting file 241 in advance (step S3).

The panic processing unit 22, which is included in the information acquiring unit 11, is called from the interrupt processing unit 21, and, after executing the display/recording processing for a panic message, the synchronization processing for a file system, and the kernel dump processing, restarts the information processing apparatus 1 (step S4).

Figure 4:
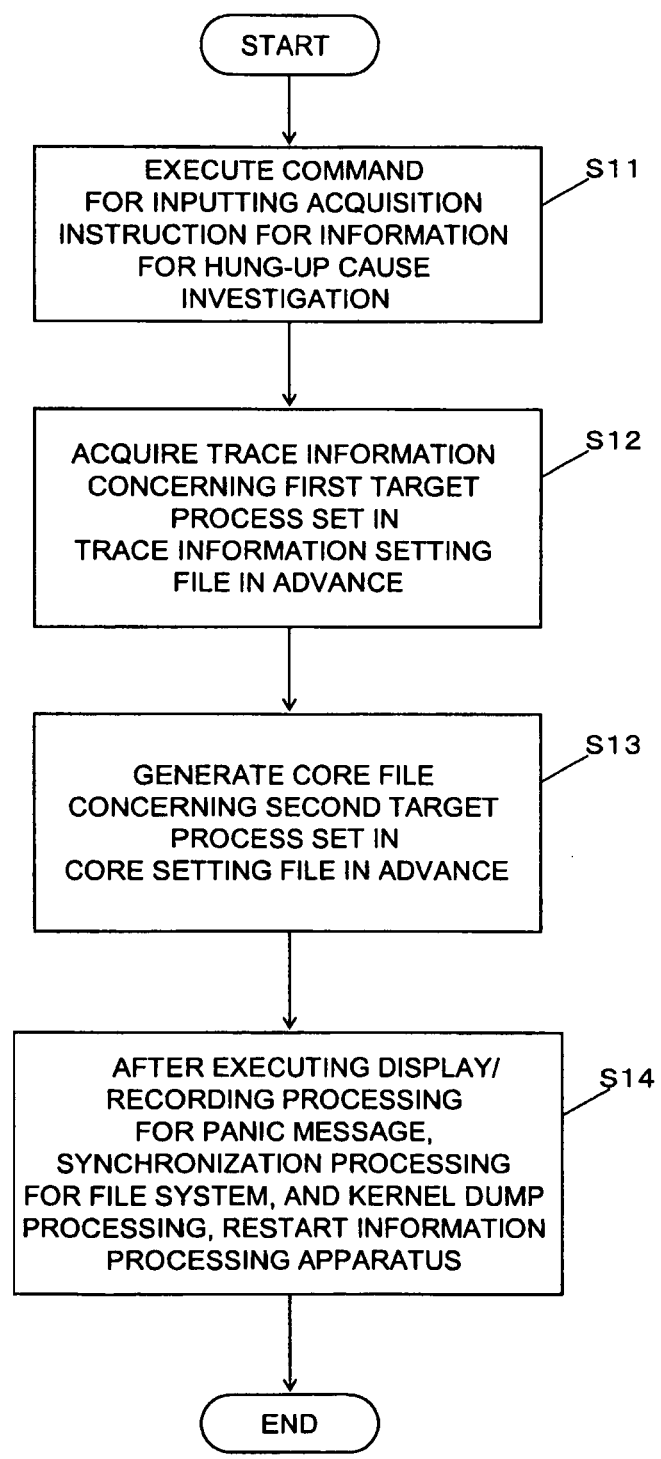
FIG. 4 is a diagram illustrating another example of the information acquisition processing flow for a hung-up cause investigation.
Figure 5:
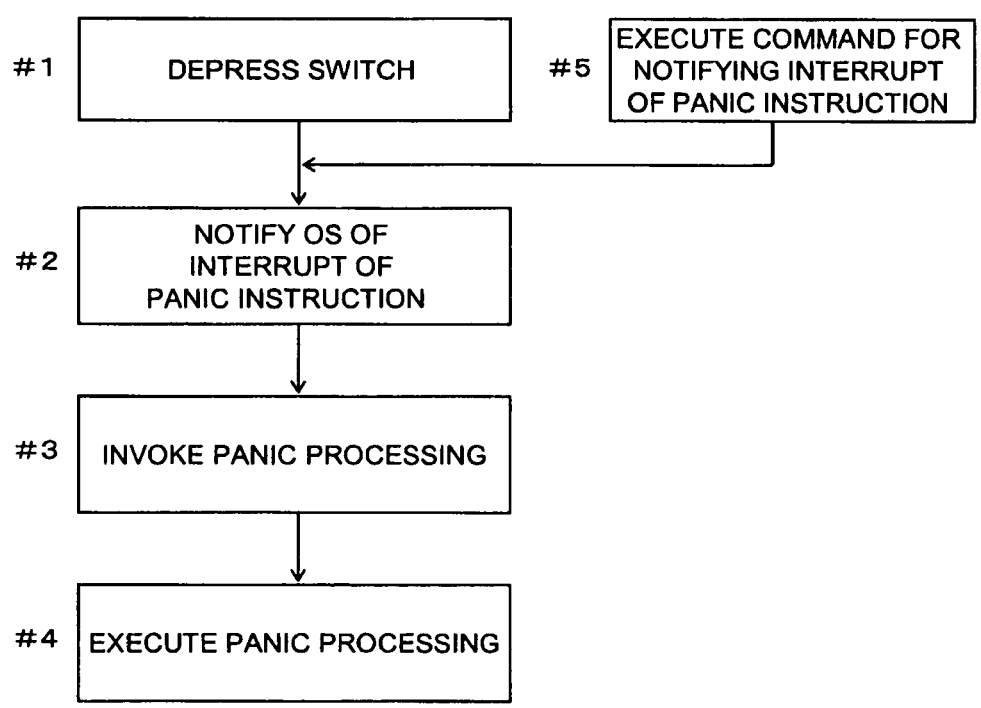
FIG. 5 is a diagram for explaining a specific example of a related art.

FIG. 4 is a diagram illustrating another example of the information acquisition processing flow for the hung-up cause investigation according to this embodiment. First, the service processor 13 executes a command which inputs an acquisition instruction of the information for the hung-up cause investigation (step S11). When the command which inputs the acquisition instruction of the information for the hung-up cause investigation is executed in step S11, the predetermined interrupt notifying unit, which is included in the information processing apparatus 1, notifies the interrupt processing unit 21 of an interrupt of panic processing.

Subsequently, the trace information acquiring unit 23, which is included in the information acquiring unit 11, is called from the interrupt processing unit 21, and acquires trace information of the first target process, which is set in the trace information setting file 231 in advance (step S12).

The core file generating unit 24, which is included in the information acquiring unit 11, is called from the interrupt processing unit 21, and generates a core file of the second target process, which is set in the core setting file 241 in advance (step S13).

The panic processing unit 22, which is included in the information acquiring unit 11, is called from the interrupt processing unit 21, and, after executing the display/recording processing for a panic message, the synchronization processing for a file system, and the kernel dump processing, restarts the information processing apparatus 1 (step S14).

According to the information processing apparatus and the method for acquiring information for the hung-up cause investigation acquire, even when the hung-up occurs in the information processing apparatus, and it is impossible to log in the information processing apparatus, it is possible to acquire trace information and a core file of the target process set in advance. As a result, it is possible to easily investigate a cause of the hung-up that occurs in the information processing apparatus.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the sprit and scope of the invention.

What is claimed is:

1. An information processing apparatus that acquires trace information of a process and memory image information of the process as information for a hung-up cause investigation when a hung-up occurs in the information processing apparatus, the information processing apparatus comprising:
   a processor to execute:
      inputting an acquisition instruction of information for a hung-up cause investigation,
      acquiring trace information of a first target process set in a first setting file as trace information targets to be acquired when the acquisition instruction of the information for the hung-up cause investigation is input, and
      generating memory image information of a second target process set in a second setting file when the acquisition instruction is input,
   wherein the acquisition instruction is input when a processing is stopped during a startup or a shutdown of the information processing apparatus, and
   wherein the acquiring and the generating are executed in accordance with a single acquisition instruction.

2. The information processing apparatus according to claim 1, wherein the target process set in the first setting file or the second setting file is any one of all processes alive, a process in an execution state or executable, a process indicated by identification information of a process designated, and a process that executes a boot processing/shutdown processing.

3. The information processing apparatus according to claim 1, wherein the inputting inputs the acquisition instruction of the information for the hung-up cause investigation using a switch.

4. The information processing apparatus according to claim 1, wherein the inputting executes a command that inputs the acquisition instruction of the information for the hung-up cause investigation.

5. A method to acquire trace information of a process and memory image information of the process as information for a hung-up cause investigation when a hung-up occurs in an information processing apparatus, the method comprising:
   inputting an acquisition instruction of information for a hung-up cause investigation in an information processing apparatus;
   acquiring trace information associated with the information processing apparatus, the trace information including a first target process which is set in a first setting file as trace information targets to be acquired when the acquisition instruction is input; and
   generating memory image information of a second target process set in a second setting file when the acquisition instruction is input,
   wherein the acquisition instruction is input when a processing is stopped during a startup or a shutdown of the information processing apparatus, and
   wherein the acquiring and the generating are executed in accordance with a single acquisition instruction.

6. The method according to claim 5, wherein the target process set in the first setting file or the second setting file is any one of all processes alive, a process in an execution state or executable, a process indicated by identification information of a process designated, and a process that executes a boot processing/shutdown processing.

7. The method according to claim 5, wherein
   the inputting inputs the acquisition instruction using a switch included in the information processing apparatus.

8. The method according to claim 5, wherein
   the inputting executes a command which inputs the acquisition instruction.

9. A method comprising:
   acquiring trace information including first target data of a first target process of the information processing apparatus; and
   generating memory image information of a second target process using a second target data stored in a separate data file from the first target data,
   wherein a single acquisition instruction triggers execution of the acquiring and the generating subsequent to a processing stoppage during a startup or a shutdown of the information processing apparatus.

* * * * *